Feb. 12, 1935.   C. C. FUERST   1,991,146
PHOTOGRAPHIC SHUTTER CONSTRUCTION
Filed Nov. 23, 1933
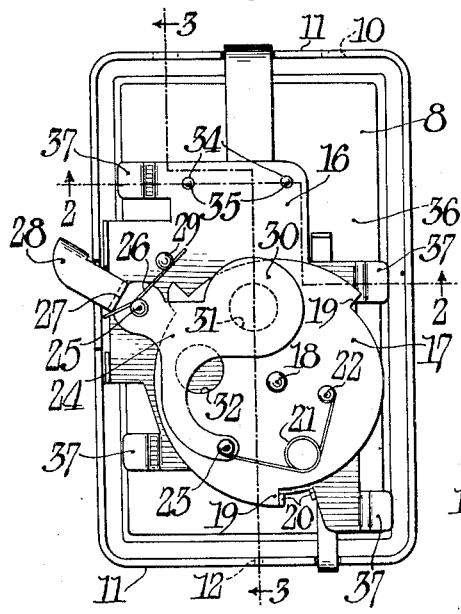
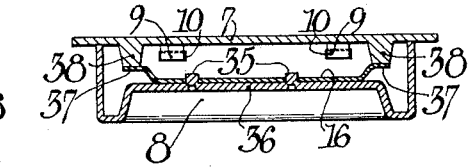
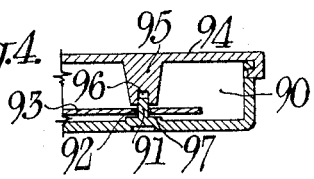
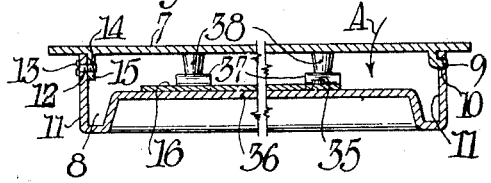
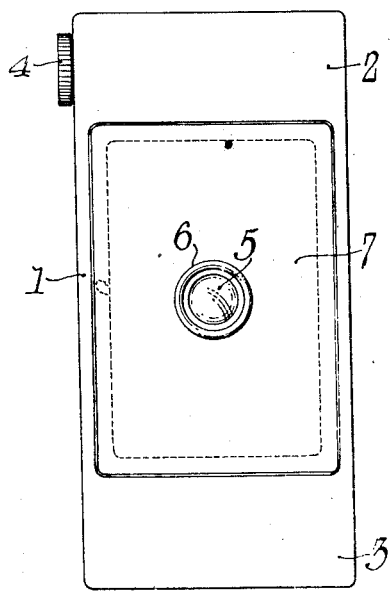
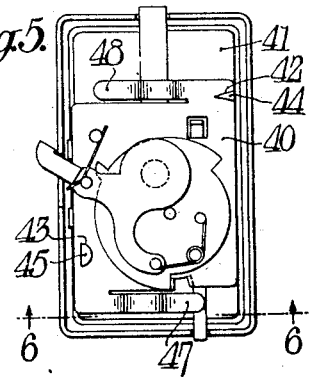
Inventor:
Carl C. Fuerst, Patented Feb. 12, 1935

1,991,146

UNITED STATES PATENT OFFICE 1,991,146

PHOTOGRAPHIC SHUTTER CONSTRUCTION

Carl C. Fuerst, Rochester, N. Y., assignor to Eastman Kodak Company, Rochester, N. Y., a corporation of New York Application November 23, 1933, Serial No. 699,362

7 Claims. (Cl. 95—59)

This invention relates to photography and more particularly to photographic shutter construction.

One object of my invention is to provide an inexpensive type of camera shutter which can be made of comparatively few parts and which can be easily assembled. Another object of my invention is to provide a shutter construction which permits a camera shutter to be easily and economically repaired. Another object of my invention is to provide a shutter which can be assembled by comparatively unskilled operators. Still another object of my invention is to provide a shutter in which the mechanism can be moved to and from the shutter casing by merely removing the shutter cover and to provide a shutter which may be securely fastened in operative position by attaching the shutter cover to the shutter casing. Other objects will appear from the following specification, the novel features being particularly pointed out in the claims at the end thereof.

Coming now to the drawing wherein like reference characters denote like parts throughout:

Figure 1 is a front elevation of a shutter constructed in accordance with and embodying a preferred form of my invention, the shutter cover plate being removed to disclose the structure of the shutter mechanism.

Figure 2 is a section taken on line 2—2 of Figure 1, the cover plate being in place.

Figure 3 is a section on line 3—3 of Figure 1.

Figure 4 is a fragmentary detail section of a second embodiment of my invention.

Figure 5 is a front elevation of a shutter similar to Figure 1 but illustrating a third embodiment of my invention.

Figure 6 is a section taken on 6—6 of Figure 5.

Figure 7 is a front elevation of a simple type of camera equipped with my new shutter.

In photographic cameras, perhaps the most expensive part of the camera is the shutter which admits light through an opening in which a lens is mounted for forming a latent image on film in the camera. These shutters are ordinarily made of a number of movable parts which must be arranged so that the exposure will be sufficiently short so that the camera will not shake when being held in the hand and sufficiently long for the light to properly expose the film.

In inexpensive cameras the shutters are made of comparatively few parts, but these parts are ordinarily difficult to assemble economically and since the assembling is ordinarily done with rivets in this type of shutter, it is difficult to make satisfactory repairs. It is also difficult to repair a shutter if it fails to work properly when it is tested in the course of manufacture.

My invention is particularly directed to a shutter construction in which the shutter mechanism can be inexpensively assembled on a plate and in which the plate can be easily positioned in the shutter casing so that it can be replaced at any time. In accordance with my invention the shutter may be assembled with rivets in the usual way.

In Figure 7 I show a simple type of camera which may consist of a camera body 1 having the usual spool chambers 2 and 3 at each end. Spool chamber 3 is provided with a winding key 4 by which film may be wound past an exposure aperture so that exposures may be made by permitting light to enter through the objective 5 which is mounted in a suitable lens barrel 6. The shutter may be mounted underneath the shutter cover plate 7 and this cover plate may be attached to the shutter casing designated broadly as 8 in a simple manner as, for instance, in the manner shown in Figure 3.

In this figure the shutter cover plate is shown as consisting preferably of a die-casting with a pair of downwardly extending hook-like members 9, as best shown in Figures 2 and 3. These hook-like members are adapted to fit into openings 10 in the flanged wall 11 of the shutter casing and at the opposite end of the shutter casing in the flanged wall 11 there is an opening 12 through which a screw 13 may pass, this screw being threaded to a complementary threaded opening 14 in a flange 15, also extending downwardly from the shutter cover.

As indicated at Figure 1, there is only one opening 12 so that only a single screw 13 is required to hold the entire shutter cover in place. In assembling the shutter cover the hooks 9 are entered into the slots 10 and the shutter cover is then rotated in the direction shown by the arrow A in Figure 3 until the threaded opening 14 registers with the opening 12 after which a single screw may fasten the cover in place.

It is possible with extremely small, inexpensive cameras to omit the screw above described for holding on the shutter cover. Accordingly, as shown in Figure 6, the shutter cover 71 may be provided with hooks 79 adapted to engage in apertures 80 similar to the construction described with reference to Figures 2 and 3 except that in this instance I prefer to have the hooks 79 carried by a flange 81 extending downwardly from the shutter cover 71. On the opposite side of the shutter casing there is a "pimple and dimple"

connection consisting of a recess or notch 82 in the upwardly extending wall 83 of the camera casing. This notch is adapted to engage a short protuberance 84 carried by the flange 81 of the shutter cover. In assembling this shutter cover the hooks 79 are entered into the openings 80 and the shutter cover is merely snapped into place, the "pimple and dimple" holding the shutter frictionally against the top of the shutter casing.

In accordance with my invention I prefer to assemble all of the shutter parts upon a base plate. As indicated in Figure 1, I may provide a base plate 16 to which an oscillatory type shutter, for instance, 17 may be pivotally mounted upon the stud 18. This shutter may turn back and forth so that the two flanges 19 may rest against the two stops 20, one flange being, of course, in engagement with one stop at a time.

In order to move the shutter between these two positions I provide a hairpin spring 21 attached to a rivet 22 carried by the shutter plate and a rivet 23 carried by an end of an L-shaped trigger member 24. This member is mounted upon a rivet 25 to turn on the rivet and a spring 26 engaging the shoulder 27 of the trigger 28 and the stud 29 of the base plate 16 normally holds the parts in the position shown in Figure 1.

This trigger member carries a disk 30 which normally forms a light-tight cover for the opening 31 through which light passes to the film. The shutter has an exposure opening 32 which may be rotated past the opening 31 to make an exposure by pressing the trigger 28 downwardly against the pressure of spring 26.

As the trigger 28 moves downwardly, the cover 30 moves out from its protective position over the aperture 31 and permits light to enter when the opening 32 of the shutter 17 coincides with the opening 31 through the base plate.

The base plate is provided with some means for locating it upon the shutter casing. In the present instance this means consists of a pair of apertures 34 each adapted to engage pins 35 carried by the bottom 36 of the shutter casing. These pins may consist of studs, if desired, but I have found that the pins can be inexpensively made by shearing up a portion of the metal of the base 36, as shown in Figure 2.

Since these cooperating elements on the shutter cover base and the base plate are not symmetrically placed with respect to the shutter case, it is obvious that when these elements cooperate the shutter base plate 16 will be definitely located in the shutter casing.

In order to hold the base plate so that the cooperating elements will be in engagement, I prefer to form upwardly on the base plate a series of arms 37, these arms extending into a position in which they may engage lugs 38 which extend downwardly from the shutter cover plate 7. Thus the interengaging parts on the shutter and the base plate, that is, the lugs 38 and the arms 37 definitely hold the base plate 16 down in the shutter casing with the cooperating elements 34 and 35 in engagement when the shutter cover is in operative position on the shutter casing.

As above described, the shutter cover may be held on the shutter casing with a single screw as at 13 or with a snap-latch connection as at 82—84 (in Figure 6).

It is evident that such a shutter construction is extremely simple to manufacture because the various shutter parts can be riveted or otherwise assembled on a base plate by somewhat skilled help, if necessary, and the entire shutter mechanism carried by the base plate can be rapidly and easily assembled in a shutter casing by merely bringing the cooperating parts of the shutter casing and base plate in engagement. The shutter can then be definitely locked in position by attaching the shutter cover.

Some of the advantages of this type shutter construction are that cameras can be manufactured and assembled and if, after testing the shutter, it does not work properly, a new one can be very rapidly substituted without holding up the shipment of the cameras to an undesirable extent and without having to remove rivets or screws which hold the shutter mechanism in most cameras of the inexpensive type.

It is obvious that different embodiments of my invention can be made without departing from the scope of my invention.

In Figure 5 I have shown a plan view of a somewhat different embodiment of my invention. In this case the base plate 40 may be located on the bottom of the shutter casing 41 by means of a pair of dissimilar notches 42 and 43, these notches fitting complementary-shaped lugs 44 and 45 carried by the shutter casing 41.

The reason for having these cooperating elements on the shutter casing and on the base plate is that it makes it impossible to position the base plate improperly in the shutter casing.

In this embodiment I have provided upwardly extending spring arms 47 and 48, which, as indicated in Figure 6, are sufficiently long to engage the under side of the shutter cover plate 71. When the shutter cover plate is swung into operative position the springs 47 and 48 are compressed a distance sufficient to permit the shutter cover to close and will thereafter exert a resilient downward pressure upon the base plate 44, holding it accurately in position with the cooperating elements of the base plate and the shutter casing in engagement. This securely locks the shutter in the desired location.

Referring to Figure 4, I have also found that a suitable type of cooperating elements on a shutter cover and shutter casing can be made as shown in this figure. Here the shutter casing 90 is provided with a formed-up pin 91 of sufficient length to extend through an aperture 92 in a shutter mechanism part 93. The shutter cover 94 is provided with a downwardly extending lug 95 cored out at 96 to receive the end of the pin 91. The space between the end of the lug 95 and the base 97 from which the pin 91 is formed may be sufficient to permit movement of the part 93 or may be of such spacing that the part 93 will be definitely held in position by the cooperating elements on the shutter cover and on the shutter casing.

In the various different embodiments of my invention above described it will be noted that the shutter parts are merely laid in the shutter casing and are positioned in the shutter casing by cooperating elements carried by the shutter mechanism and carried by the shutter casing. The shutter cover is then placed on the casing in such a manner that the positioned shutter parts are definitely held in operative relation to the shutter casing. This construction greatly facilitates the manufacture, assembly, and repair, particularly of inexpensive types of photographic shutters.

Having thus described my invention, what I claim as new and desire to secure by Letters Patent of the United States is:

1. In a camera shutter, the combination with a shutter casing, of shutter mechanism adapted to be mounted in the shutter casing as a unit, cooperating elements on the shutter mechanism unit and shutter casing for locating the former with respect to the latter, and means carried by the shutter cover for operatively engaging a part of the shutter mechanism to hold the cooperating elements of the shutter mechanism and shutter casing in operative relation.

2. In a camera shutter, the combination with a shutter casing, of a shutter mechanism unit adapted to be mounted in the shutter casing, one of said parts including an aperture; cooperating elements on the shutter mechanism and shutter casing for locating the former with respect to the latter and comprising a pin carried by one part adapted to engage the aperture in the other part, parts of said shutter cover and shutter mechanism being adapted to contact and hold the shutter mechanism in the shutter casing, and means for attaching the shutter cover to the casing.

3. In a camera shutter, the combination with a shutter casing, a plate carrying shutter mechanism mounted in the casing, a shutter cover, and means for securing the plate in position in the casing including cooperating elements on the shutter casing and plate adapted to definitely position the latter on the former, and interengaging parts on the shutter cover and plate for holding the cooperating elements in place when said shutter cover is held in place, and means for securing the shutter cover on the shutter casing.

4. In a camera shutter, the combination with a shutter casing, an apertured plate carrying shutter mechanism mounted in the casing, a pin carried by the shutter casing adapted to engage the aperture in the plate to definitely locate said plate, and means including a shutter cover adapted to be attached to the shutter casing for holding the located plate in a fixed position in the casing.

5. In a camera shutter, the combination with a shutter casing, an apertured plate carrying shutter mechanism, a pin in the shutter casing adapted to enter said plate aperture and locate said plate, arms carried by the plate, and a cover adapted to be fastened to said casing and to contact with said plate arms to hold said plate fixedly in its located position.

6. In a camera shutter, the combination with a shutter casing, an apertured plate carrying shutter mechanism, a pin in the shutter casing adapted to enter said plate aperture and locate said plate, spring arms carried by said plate, a shutter cover removably fastened to said shutter casing and being adapted to engage said spring arms and resiliently hold said plate in a fixed position determined by the pin and slot connection between the plate and shutter casing.

7. In a camera shutter, the combination with a shutter casing, means for locating shutter mechanism in said casing comprising one cooperating member, shutter mechanism including a second cooperating member adapted to cooperate with the first-mentioned cooperating member for locating the shutter mechanism in a definite position in the casing, a cover for said shutter casing, means for attaching the cover to the shutter casing, said shutter cover being adapted to contact with and to be the sole means for holding the shutter mechanism in the casing with the cooperating parts of the shutter casing and shutter mechanism in contact.

CARL C. FUERST.